United States Patent
Peng et al.

(10) Patent No.: US 8,246,000 B2
(45) Date of Patent: *Aug. 21, 2012

(54) MOUNTING APPARATUS FOR STORAGE DEVICE

(75) Inventors: Wen-Tang Peng, Taipei Hsien (TW); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 269 days.

This patent is subject to a terminal disclaimer.

(21) Appl. No.: 12/755,397

(22) Filed: Apr. 6, 2010

(65) Prior Publication Data

US 2011/0175502 A1    Jul. 21, 2011

(30) Foreign Application Priority Data

Jan. 18, 2010 (CN) .......................... 2010 1 0300390

(51) Int. Cl.
*F16M 11/00* (2006.01)

(52) U.S. Cl. .............. 248/682; 361/679.31; 361/679.37; 361/679.39

(58) Field of Classification Search .................. 248/694, 248/682; 361/679.31, 679.32, 679.33, 679.37, 361/679.38, 679.39
See application file for complete search history.

(56) References Cited

U.S. PATENT DOCUMENTS

| | | | |
|---|---|---|---|
| 6,343,009 B1 * | 1/2002 | Liu et al. | 361/679.31 |
| 6,637,719 B2 * | 10/2003 | Jiang | 248/682 |
| 7,016,190 B1 * | 3/2006 | Chang | 361/679.33 |
| 7,492,586 B2 * | 2/2009 | Peng et al. | 361/679.33 |
| 7,684,181 B2 * | 3/2010 | Peng et al. | 361/679.33 |
| 7,684,182 B2 | 3/2010 | Zhang et al. | |
| 7,701,707 B2 * | 4/2010 | Peng et al. | 361/679.37 |
| 7,729,110 B2 * | 6/2010 | Zhang et al. | 361/679.33 |
| 7,817,413 B2 | 10/2010 | Peng et al. | |
| 8,064,195 B2 * | 11/2011 | Zhang et al. | 361/679.33 |
| 2005/0190535 A1 * | 9/2005 | Peng et al. | 361/685 |
| 2008/0278856 A1 * | 11/2008 | Peng et al. | 360/244.3 |
| 2009/0091882 A1 * | 4/2009 | Liu et al. | 361/679.33 |
| 2010/0321879 A1 * | 12/2010 | Peng et al. | 361/679.33 |
| 2011/0049319 A1 * | 3/2011 | Peng et al. | 248/309.1 |

FOREIGN PATENT DOCUMENTS

| | | |
|---|---|---|
| CN | 2297126 Y | 11/1998 |
| CN | 2935244 Y | 8/2007 |
| CN | 101436424 A | 5/2009 |
| CN | 101515469 A | 8/2009 |
| CN | 101593008 A | 12/2009 |

* cited by examiner

*Primary Examiner* — Bradley Duckworth

(74) *Attorney, Agent, or Firm* — Altis Law Group, Inc.

(57) ABSTRACT

A mounting apparatus includes a frame and a fastener made of conducting material. The frame includes opposite first and second fixing arms, and an end arm connected between the first and second fixing arms. The first fixing arm is pivotably connected to the end arm. Two pins protrude from an inner side of each of the first and second fixing arms, for correspondingly engaging in fixing holes of a storage device. The fastener is fixed to one of the first and second fixing arms. The fastener includes a head exposed out of the one of the first and second fixing arms, and a post-shaped engaging portion inserted into a threaded hole of the storage device and contacting a threaded portion of the threaded hole of the storage device. The fastener is capable of connecting the storage device to ground.

11 Claims, 3 Drawing Sheets

MOUNTING APPARATUS FOR STORAGE DEVICE

CROSS-REFERENCES TO RELATED APPLICATION

Relevant subject matter is disclosed in a co-pending U.S. patent application Ser. No. 12/755,396 filed on the same date and having a same title with the present application, which is assigned to the same assignee as named herein.

BACKGROUND

1. Technical Field

The present disclosure relates to a mounting apparatus for a storage device.

2. Description of Related Art

An electronic device, such as a computer, generally includes a plastic frame, and a plurality of screws extending through the frame to fix a storage device and connect the storage device to ground. However, these screws are usually too small and difficult to handle, the installation of the storage device in the computer is labor-intensive. Additionally, because of their small size, the screws are easily dropped, by an assembler, into the computer.

DETAILED DESCRIPTION

Figure 1:
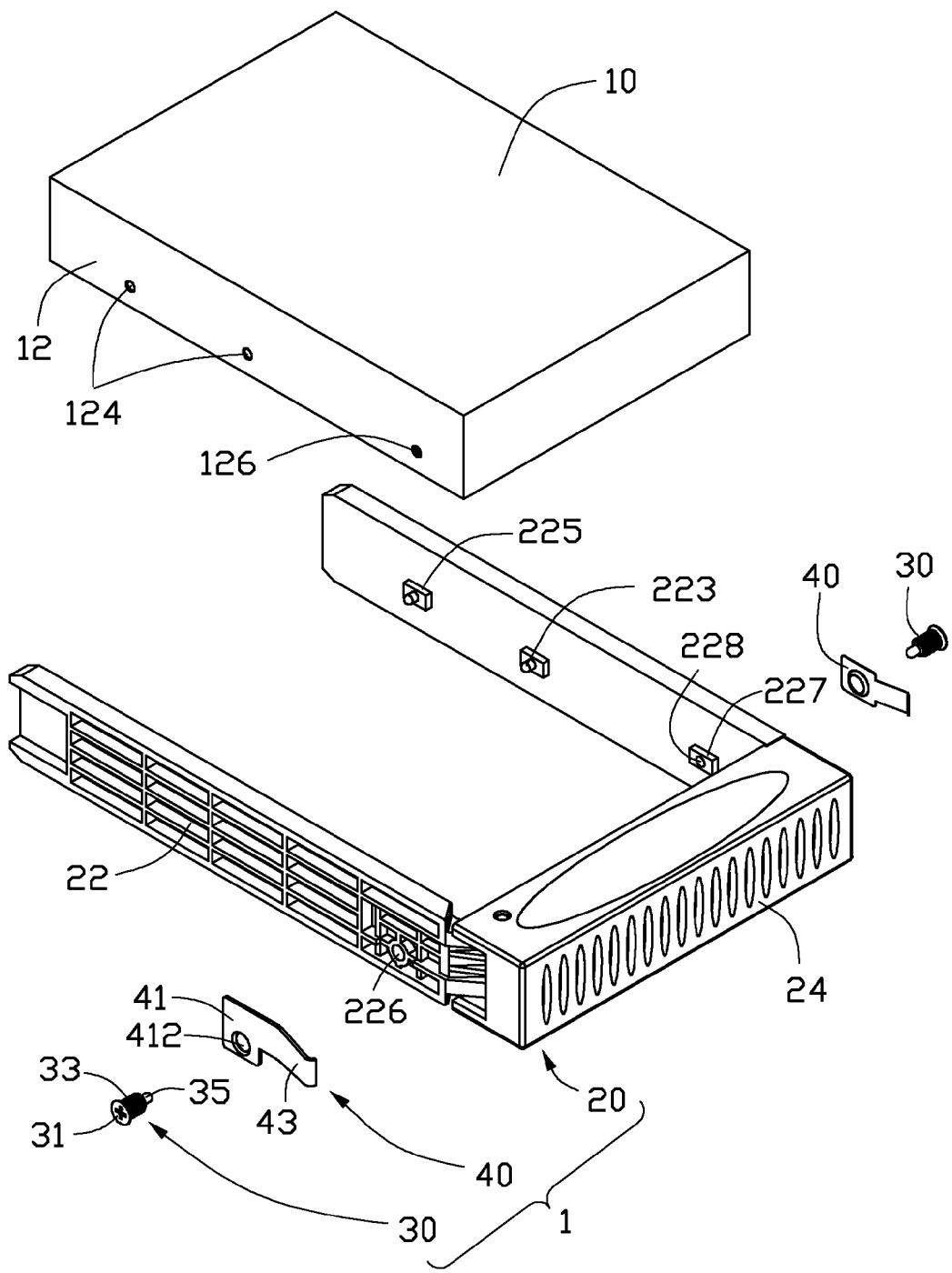
FIG. 1 is a partly exploded, isometric view of an exemplary embodiment of a mounting apparatus together with a storage device.

Referring to FIG. 1, an exemplary embodiment of a mounting apparatus 1 is provided for fixing a storage device 10, such as a hard disk drive. The mounting apparatus 1 includes a frame 20, two fasteners 30, and two resilient grounding pieces 40.

The storage device 10 includes two opposite sidewalls 12. Two spaced fixing holes 124 and a threaded hole 126 are defined in each sidewall 12. In other embodiments, the fixing holes 124 may be threaded holes.

The frame 20 is made of plastic material, and includes two opposite fixing arms 22, and an end arm 24 perpendicularly connected between the fixing arms 22, wherein one of the fixing arms 22 is pivotably connected to the end arm 24. Two pins 223 protrude from an inner side of each fixing arm 22, for engaging in the fixing holes 124 of a corresponding sidewall 12 of the storage device 10. A washer 225 is placed around each pin 223 adjoining to the corresponding fixing arm 22. A threaded hole 226 is defined in each fixing arm 22, aligning with the threaded hole 126 of the corresponding sidewall 12 of the storage device 10. A washer 227 is installed on the inner side of each fixing arm 22. A through hole 228 is defined in the washer 227 aligning with the threaded hole 226 of the corresponding fixing arm 22.

Each fastener 30 is made of conducting material, and includes a head 31, a threaded portion 33 extending from the head 31, and a post-shaped engaging portion 35 extending from the threaded portion 33 away from the head 31.

Each resilient grounding piece 40 is made of conducting material, and includes a main body 41 and a resilient arm 43 extending from the main body 41. A bore 412 is defined in the main body 41. The resilient arm 43 bends outwardly relative to the main body 41.

Figure 2:
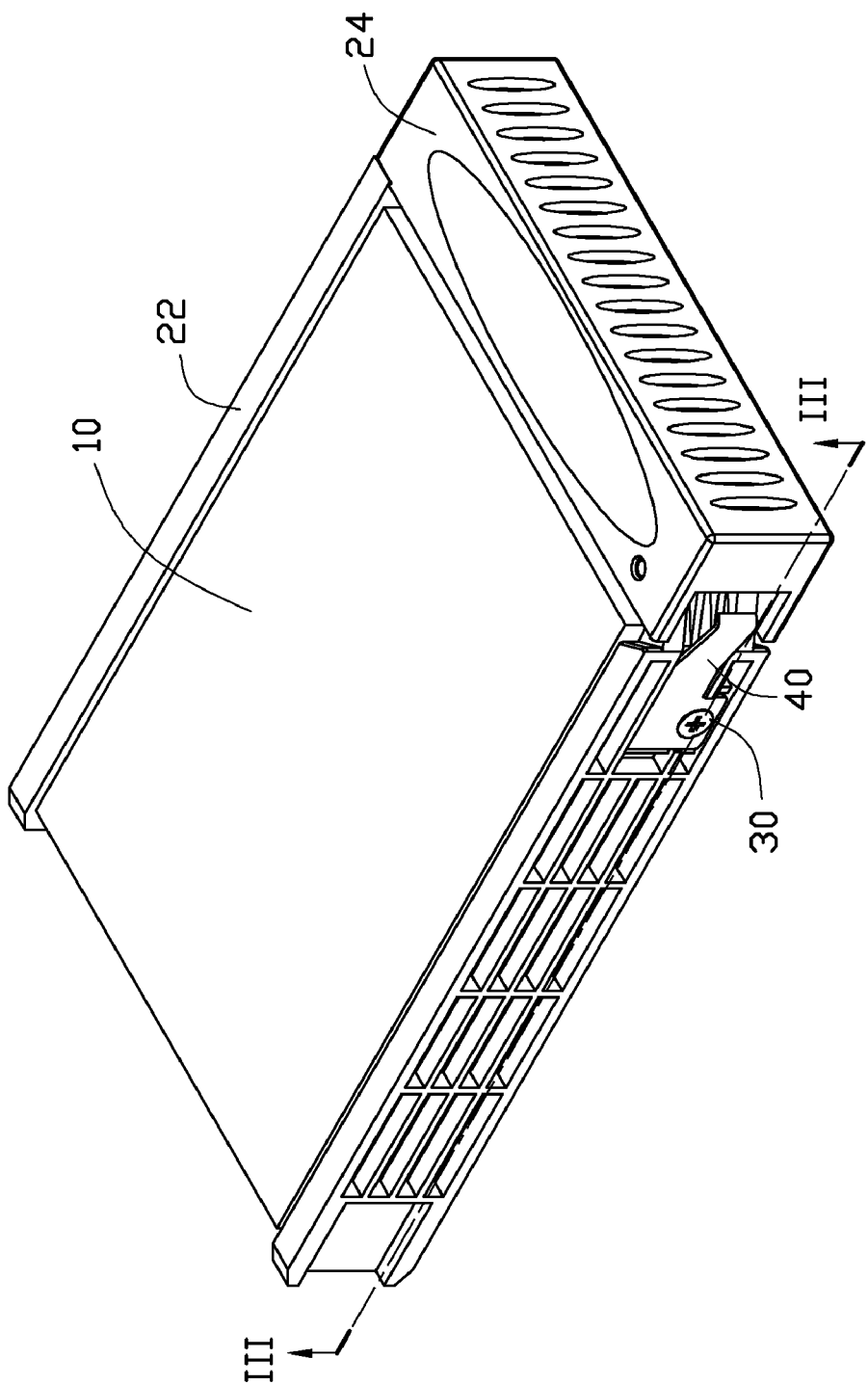
FIG. 2 is an assembled, isometric view of the mounting apparatus and the storage device of FIG. 1.
Figure 3:
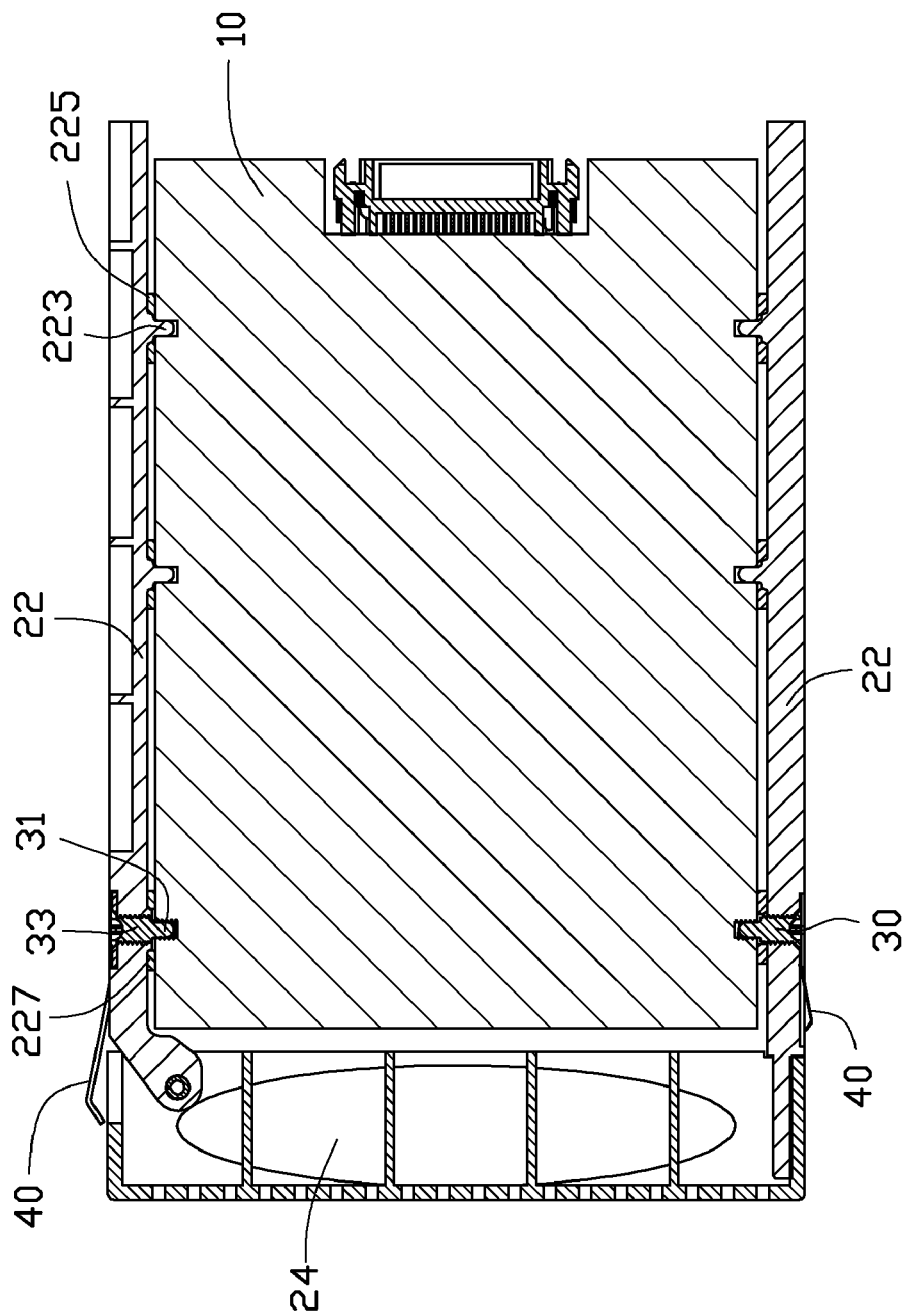
FIG. 3 is a cross-section view taken along the line III-III of the mounting apparatus and the storage device of FIG. 2.

Referring to FIGS. 2 and 3, to assemble the mounting apparatus 1, the engaging portions 35 of the fasteners 30 correspondingly extend through the bores 412 of the resilient grounding pieces 40, the threaded holes 226 of the fixing arms 22, and the through holes 228 of the washers 227 successively. The threaded portions 33 of the fasteners 30 correspondingly screw into the threaded holes 226 of the fixing arms 22. The resilient grounding pieces 40 are correspondingly sandwiched between the fixing arms 22 and the heads 31 of the fasteners 30. The resilient arms 43 of the resilient grounding pieces 40 bend away from the corresponding fixing arms 22, respectively.

To assemble the storage device 10 into the mounting apparatus 1, the pivotable fixing arm 22 of the frame 20 rotates away from the non-pivotably connected fixing arm 22. The storage device 10 is placed between the fixing arms 22, allowing the pins 223 and the engaging portion 35 of the non-pivotably connected fixing arm 22 to correspondingly insert into the fixing holes 124 and the threaded hole 126 of a corresponding sidewall 12 of the storage device 10. The pivotable fixing arm 22 rotates towards the storage device 10. The pins 223 and the engaging portion 35 of the pivotable fixing arm 22 are correspondingly inserted into the fixing holes 124 and the threaded hole 126 of the opposite sidewall 12 of the storage device 10. Circumferences of the engaging portions 35 of the fasteners 30 adequately contact threaded portions of the threaded holes 126, respectively. The pivotable fixing arm 22 is locked to the end arm 24 via a locking mechanism (not shown). Thereby, the storage device 10 is fixed to the mounting apparatus 1. The washers 225 and 227 of the fixing arms 22 contact corresponding sidewalls 12 of the storage device 10, to protect the storage device 10 from vibrations.

When the storage device 10 and the mounting apparatus 1 are installed into a bracket of a chassis (not shown), the resilient arms 43 of the resilient grounding pieces 40 contact sidewalls of the bracket, and connect the storage device 10 to ground via the fasteners 30.

In this embodiment, the pins 223 of each fixing arm 22, and the engaging portions 35 of the fasteners 30 are bare and have no threaded portions, therefore, the storage device 10 can be easily fixed to the mounting apparatus 1 and need no tools.

In another embodiment, the fasteners 30 can be designed longer, to allow extended sections of the heads 31 of the fasteners 30 to be exposed from the corresponding fixing arms 22 of the frame 20 and contact the sidewalls of the bracket, thereby, the storage device 10 connects to ground by the fasteners 30. Therefore, the resilient grounding pieces 40 can be omitted.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A mounting apparatus for a storage device, the storage device comprising two opposite sidewalls, each of the sidewalls defining two fixing holes, and one of the sidewalls defining a threaded hole, the mounting apparatus comprising:

a frame comprising opposite first and second fixing arms, and an end arm connected between the first and second fixing arms, wherein the first fixing arm is pivotably connected to the end arm, two pins protrude from an inner side of each of the first and second fixing arms, for engaging in the fixing holes of a corresponding sidewall of the storage device;

a fastener made of conducting material fixed to one of the first and second fixing arms, the fastener comprising a head exposed out of said one of the first and second fixing arms, and a post-shaped engaging portion extending through said one of the first and second fixing arms and inserted into the threaded hole of the storage device, a circumference of the engaging portion adequately contacting a threaded portion of the threaded hole of the storage device; and a resilient grounding piece made of conducting material, the resilient grounding piece comprising a main body, and a resilient arm extending from the main body, wherein the main body is fixed between the head of the fastener and said one of the first and second fixing arms, the resilient arm bends away from said one of the first and second fixing arms.

2. The mounting apparatus of claim 1, wherein the frame is made of plastic material.

3. The mounting apparatus of claim 1, wherein a bore is defined in the main body, a threaded hole is defined in said one of the first and second fixing arms aligning with the threaded hole of the storage device, the fastener further comprises a threaded portion between the head and the engaging portion, the engaging portion extends through the bore of the main body and the threaded hole of said one of the first and second fixing arms, the threaded portion engages in the threaded hole of said one of the first and second fixing arms.

4. The mounting apparatus of claim 3, wherein a washer is installed on the inner side of said one of the first and second fixing arms, a through hole is defined in the washer aligning with the threaded hole of said one of the first and second fixing arms, to allow the engaging portion of the fastener to extend through the washer.

5. The mounting apparatus of claim 1, wherein a washer is placed around each pin adjoining to the corresponding first or second fixing arm.

6. A mounting apparatus for a storage device, the storage device comprising two opposite sidewalls, each of the sidewalls defining a fixing hole and a threaded hole, the mounting apparatus comprising:

a frame comprising two opposite fixing arms, and an end arm connected between the fixing arms, wherein one of the fixing arms is pivotably connected to the end arm, a pin protrudes from an inner side of each of the fixing arms, for engaging in the fixing hole of a corresponding sidewall of the storage device;

two fasteners made of conducting material, each of the fasteners comprising a head, a threaded portion extending from the head, and a post-shaped engaging portion extending from the threaded portion away from the head, wherein the threaded portions of the fasteners correspondingly engage with the fixing arms of the frame, the heads correspondingly expose out of the fixing arms, the engaging portions correspondingly extend through the fixing arms and insert into the threaded holes of the storage device, circumferences of the engaging portions adequately contact threaded portions of the threaded holes respectively; and two resilient grounding pieces made of conducting material, each of the resilient grounding pieces comprising a main body, and a resilient arm extending from the main body, wherein the main bodies of the resilient grounding pieces are respectively fixed between the heads of the fasteners and the corresponding fixing arms, the resilient arms correspondingly bend away from the fixing arms.

7. The mounting apparatus of claim 6, wherein a threaded hole is defined in each of the fixing arms in alignment with the threaded hole of a corresponding sidewall of the storage device, the threaded portion of each fastener engages in the threaded hole of a corresponding one of the fixing arms.

8. The mounting apparatus of claim 7, wherein a washer is installed on the inner side of each of the fixing arms, a through hole is defined in each washer aligning with the threaded hole of the corresponding fixing arm, to allow the engaging portion of a corresponding fastener to extend through the washer.

9. The mounting apparatus of claim 6, wherein the frame is made of plastic material.

10. The mounting apparatus of claim 6, wherein a bore is defined in each main body, the engaging portion and the threaded portion of each fastener extend through the bore of a corresponding main body and fix the corresponding main body to the corresponding fixing arm.

11. The mounting apparatus of claim 6, wherein a washer is placed around each pin adjoining to the corresponding fixing arm.

* * * * *